United States Patent
Ban et al.

(10) Patent No.: US 7,826,356 B2
(45) Date of Patent: Nov. 2, 2010

(54) METHOD AND SYSTEM FOR CONTROLLING FLOW IN AN ASYMMETRIC COMMUNICATION CHANNEL

(75) Inventors: Oliver Keren Ban, Austin, TX (US); Ifeoma Nneamaka Chisom Onwughalu, Raleigh, NC (US); Eric James St. Amand, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 11/557,705

(22) Filed: Nov. 8, 2006

(65) Prior Publication Data

US 2008/0107111 A1 May 8, 2008

(51) Int. Cl.
*H04L 12/56* (2006.01)
*H04J 1/16* (2006.01)

(52) U.S. Cl. .................. 370/230; 370/252; 370/282; 709/203

(58) Field of Classification Search .......... 370/252, 370/230, 282; 709/203
See application file for complete search history.

(56) References Cited

U.S. PATENT DOCUMENTS

| | | | |
|---|---|---|---|
| 5,682,460 A * | 10/1997 | Hyziak et al. ............ 709/217 |
| 6,256,672 B1 | 7/2001 | Redpath |
| 6,535,911 B1 * | 3/2003 | Miller et al. ............. 709/217 |
| 6,895,005 B1 * | 5/2005 | Malin et al. .............. 370/389 |
| 7,003,736 B2 | 2/2006 | Kanevsky et al. |
| 7,035,902 B1 | 4/2006 | Bates et al. |
| 7,398,901 B2 * | 7/2008 | Vouriot .................... 223/75 |
| 2001/0000084 A1 * | 3/2001 | Suzuki et al. ............ 713/201 |
| 2002/0016818 A1 | 2/2002 | Kirani et al. |
| 2002/0194325 A1 * | 12/2002 | Chmaytelli et al. ....... 709/224 |
| 2003/0055907 A1 | 3/2003 | Stiers |
| 2003/0163515 A1 | 8/2003 | Loveland et al. |
| 2003/0208546 A1 | 11/2003 | DeSalvo et al. |
| 2003/0231655 A1 * | 12/2003 | Kelton et al. ............. 370/468 |
| 2004/0024826 A1 | 2/2004 | Halahmi et al. |
| 2004/0054800 A1 * | 3/2004 | Shah et al. ............... 709/231 |
| 2005/0052692 A1 | 3/2005 | Buschi et al. |
| 2005/0060373 A1 | 3/2005 | Ban |
| 2005/0076085 A1 | 4/2005 | Budd et al. |
| 2005/0091324 A1 | 4/2005 | Flocken |
| 2005/0154795 A1 * | 7/2005 | Kuz et al. ................. 709/227 |
| 2005/0188026 A1 | 8/2005 | Hilbert et al. |
| 2005/0193069 A1 | 9/2005 | Brown et al. |
| 2005/0193070 A1 | 9/2005 | Brown et al. |
| 2005/0229072 A1 * | 10/2005 | Setton et al. ............. 714/748 |
| 2006/0002340 A1 * | 1/2006 | Criss et al. .............. 370/328 |
| 2006/0006222 A1 * | 1/2006 | Brey et al. ............... 235/379 |
| 2006/0031537 A1 * | 2/2006 | Boutboul et al. ......... 709/228 |
| 2006/0098662 A1 * | 5/2006 | Gupta et al. ............. 370/401 |
| 2006/0117172 A1 * | 6/2006 | Zhang et al. ............... 713/2 |
| 2006/0184635 A1 * | 8/2006 | Owen et al. .............. 709/206 |
| 2006/0251086 A1 * | 11/2006 | Ha et al. .................. 370/401 |
| 2007/0168394 A1 * | 7/2007 | Vivekanand ............... 707/200 |

FOREIGN PATENT DOCUMENTS

EP 1630690 A1 1/2006

* cited by examiner

*Primary Examiner*—John Pezzlo
(74) *Attorney, Agent, or Firm*—Yee & Associates, P.C.; Steven L. Bennett (57) ABSTRACT

A system for controlling transmission of data over a network. In response to receiving a content request from a client device coupled to the network, an initial data packet is sent to the client device. In response to receiving a feedback packet from the client device, transmission of the content request is dynamically adjusted.

13 Claims, 4 Drawing Sheets

FIG. 4

METHOD AND SYSTEM FOR CONTROLLING FLOW IN AN ASYMMETRIC COMMUNICATION CHANNEL

BACKGROUND OF THE INVENTION

1. Field of the Invention

The present invention relates generally to an improved data processing system. More specifically, the present invention is directed to a computer implemented method, system, and computer usable program code for controlling transmission of data over an asymmetric communication network.

2. Description of the Related Art

Today, there is no doubt that the Internet has changed the way people and businesses communicate. For many people and businesses, electronic mail (e-mail) has virtually replaced traditional letters and even telephone calls as the preferred choice of correspondence. Every day, billions of e-mail messages are sent on the Internet. E-mail has been the most rapidly adopted form of communication ever known. In less than two decades, it has gone from obscurity to mainstream dominance.

The availability of extensive e-mail distribution channels makes it possible to provide a relatively fast, convenient, and cost efficient means of communication between parties. Also, a party may include an attachment with an e-mail to transmit a variety of different objects, such as documents, images, audio, video, or other content. When a party attaches lengthy documents, digital photographs, audio files, or video clips to an e-mail for transmission, the e-mail attachment tends to be rather large. However, there are network restrictions that may make the transfer of such large e-mail attachments very cumbersome and taxing for the network communication channels.

In addition, an ever increasing number of message handling applications are starting to encode or dump these large documents and multi-media objects, such as compressed or uncompressed audio and video files, directly into the message body, itself. These message handling applications dump these large objects into the message body because difficulties may exist when these large objects are handled indirectly in e-mail attachments. Furthermore, people-to-machine and machine-to-machine communications normally use a non-attachment format type. Consequently, even the message body of an e-mail may become too large and cumbersome for the network communication channels to transfer properly.

Therefore, it would be beneficial to have an improved computer implemented method, system, and computer usable program code for effectively increasing overall capacity of network communication channels to efficiently transfer large e-mail message bodies and attachments or any other large data download.

BRIEF SUMMARY OF THE INVENTION

Illustrative embodiments provide a computer implemented method, system, and computer usable program code for controlling transmission of data over a network. An initial data packet is sent to a client device coupled to the network in response to receiving a content request from the client device. Transmission of the content request is dynamically adjusted in response to receiving a feedback packet from the client device.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
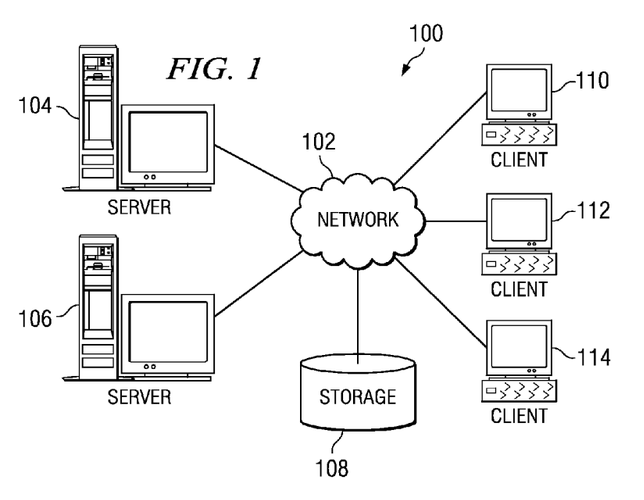
FIG. 1 is a pictorial representation of a network of data processing systems in which illustrative embodiments may be implemented.
Figure 2:
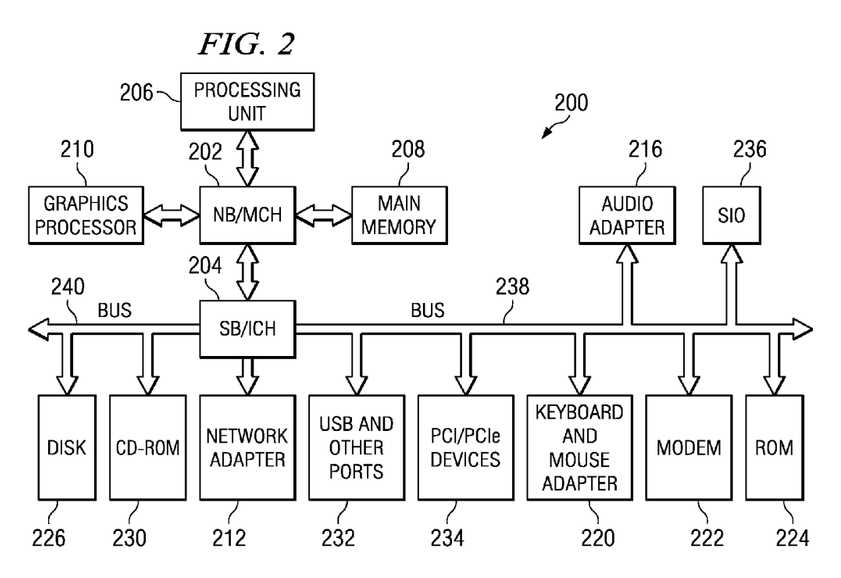
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, LAN adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). HDD 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system (OS) runs on processing unit 206 and coordinates and provides control of various components within data processing system 200 in FIG. 2. The OS may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the OS and provides calls to the OS from Java programs or applications executing on data processing system 200. Java and all Java-based trademarks are trademarks of Sun Microsystems, Inc. in the United States, other countries, or both.

Instructions for the OS, the object-oriented programming system, and applications or programs are located on storage devices, such as HDD 226, and may be loaded into main memory 208 for execution by processing unit 206. The processes of illustrative embodiments may be performed by processing unit 206 using computer implemented instructions, which may be located in a memory such as, for example, main memory 208, ROM 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of illustrative embodiments may be applied to a multiprocessor data processing system.

In some illustrative examples, data processing system 200 may be a personal digital assistant (PDA), which is generally configured with flash memory to provide non-volatile memory for storing OS files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Illustrative embodiments provide a computer implemented method, system, and computer usable program code for controlling transmission of data over a network. In response to receiving a content request from a client device coupled to the network, a server device sends an initial data packet to the client device. The initial data packet may include one or more title symbols for one or more data downloads contained within the content request.

A user of the client device, upon reviewing the initial data packet containing the one or more title symbols, decides whether to continue the download of the content request. If the client device receives a user input to continue the download of the content request, then the client device sends a feedback packet to the server device. The feedback packet may include a state and status of the client device and a capacity and condition of an asymmetric communication channel within the network between the client device and the server device. In addition, the feedback packet may include an identification, address, checker, and size of each download contained within the content request.

In response to receiving the feedback packet from the client device, the server device dynamically adjusts transmission of the content request according to the contents of the feedback packet. Moreover, the client device continues to send feedback packets to the server device on a pre-determined time interval basis. The pre-determined time interval to send a feedback packet from the client device to the server device may, for example, be once every second, to continually apprise the server device of current conditions.

Further, if the content request contains a plurality of downloads, the server device applies download priority rules. The download priority rules may, for example, include an address priority rule and a size priority rule. The server device uses the download priority rules to establish the order of download transmission of the plurality of downloads present in the content request.

Thus, illustrative embodiments provide the ability to adaptively adjust the transmission of data over a network on the fly according to the current environment. As a result, network efficiency is increased, as well as, overall network capacity. Therefore, maximization of data processing system resources also is increased.

Figure 3:
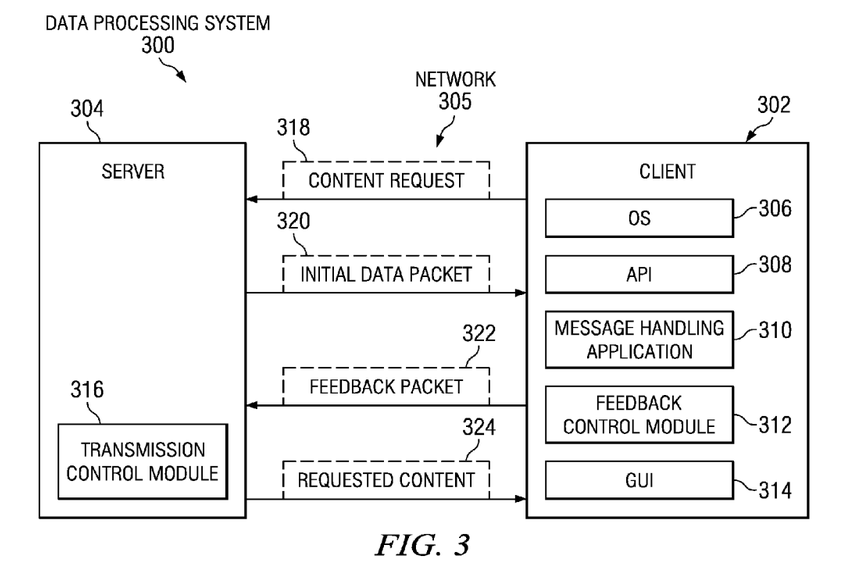
FIG. 3 is a block diagram of a data processing system for controlling transmission of data over a network in accordance with an illustrative embodiment.

With reference now to FIG. 3, a block diagram of a data processing system for controlling transmission of data over a network is depicted in accordance with an illustrative embodiment. Data processing system 300 may, for example, be implemented in network data processing system 100 in FIG. 1. However, it should be noted that the example depicted in FIG. 3 is only intended for the purpose of illustration and does not imply any architectural limitations on illustrative embodiments. Illustrative embodiments may include any components necessary to accomplish the task of controlling transmission of data over a network.

In the depicted example of FIG. 3, data processing system 300 includes client 302 and server 304. Client 302 is coupled to server 304 by network 305. For example, client 110 is coupled to server 106 via network 102 in FIG. 1. In addition, client 302 is a client to server 304.

Network 305 is the medium used to provide communications links between client 302 and server 304 within data processing system 300. Network 305 may be a symmetric or asymmetric communication network. A symmetric communication network for a client/server environment refers to any system in which data speed or quantity is the same in both directions. Examples of symmetric communication may include two-way radio, standard twisted-pair telephone Internet connections, cable modem Internet connections in which the cable is used for transmission as well as for reception, and full-motion videoconferencing.

An asymmetric communication network for a client/server environment has independent forward and return communication channels operating at different speeds and/or under different protocols on the same or different communication media to provide efficient utilization of shared resources. For example, asymmetric communication network 305 may include a communication channel that connects client 302 with server 304, where the bandwidth from client 302 to server 304 is much smaller than the bandwidth from server 304 to client 302. Consider an Internet connection in which downstream data from server 304 to client 302 flows over a broadband satellite downlink, while upstream data from client 302 to server 304 is sent over a twisted-pair telephone line. Also, consider that most of the bytes come downstream from server 304 to client 302 as relatively large graphics, sound, multimedia, and HTML files, while upstream data from client 302 to server 304 mainly consists of content requests, such as uniform resource locator (URL) links, which, in comparison, contain very few bytes.

Client 302 includes OS 306, application programming interface (API) 308, message handling application 310, feedback control module 312, and GUI 314. OS 306 runs on a processor, such as processor unit 206 in FIG. 2, and provides high-level control of the components within client 302. API 308 allows a user of client 302, which may be an individual or a software routine, to invoke system capabilities using a standard consistent interface without concern for how the particular functionality is implemented.

Message handling application 310 may represent any type of message handling application, such as, for example, an e-mail application, instant messaging application, video conferencing application, and the like, which a user of client 302 may utilize to send and receive messages and attachments. In addition, message handling application 310 may represent a Web browsing application, which a user of client 302 may utilize to request data content via the Internet. Further, message handling application 310 may represent a plurality of different message handling applications. In other words, message handling application 310 is a software application(s) that a user may utilize to send and receive messages and/or request content downloads.

Client 302 uses feedback control module 312 to send feedback to server 304. Systems that utilize feedback are typically known as closed-loop control systems. A closed-loop control system uses the feedback to control processes occurring within the closed-loop control system. Thus, data processing system 300 may be considered a closed-loop control system because feedback control module 312 provides feedback to server 304. Server 304 uses the feedback to dynamically control changes to the transmission of data to client 302 via network 305 on the fly. It should be noted that feedback control module 312 may be implemented entirely as software, hardware, or as a combination of software and hardware components.

A user of client 302 utilizes GUI 314 to interact with applications residing in client 302, such as message handling application 310. GUI 314 is a graphics-based user interface that incorporates movable windows and icons, which may be manipulated by user input devices, such as, for example, a keyboard and mouse. Typically, GUI 314 is the standard way a user interacts with a computer.

Server 304 includes transmission control module 316. Transmission control module 316, like feedback control module 312, also may be implemented entirely as software, hardware, or as a combination of software and hardware components. Server 304 uses transmission control module 316 to control transmission of requested data to client 302 by utilizing feedback provided by feedback control module 312.

For example, a user utilizing message handling application 310 sends content request 318, which may contain one or more requested data downloads, to server 304 via network 305. After receiving content request 318, server 304 sends initial data packet 320, which may include one or more title symbols for the one or more requested data downloads within content request 318, to client 302. A title symbol represents information regarding a data download, such as, for example, the title of the data download and the size of the data download. However, it should be noted that illustrative embodiments are not restricted to only including the title and size of the data download in the title symbol. Illustrative embodiments may include any other information necessary within the title symbol to accomplish processes of illustrative embodiments, such as, for example, a description, identification, and address of the data download. Subsequent to receiving and reviewing the title symbols in initial data packet 320, the user decides whether to download the requested content based upon the one or more title symbols and their respective download size.

If the user decides to continue with the data download of content request 318, the user utilizing GUI 314 inputs a user input into message handling application 310 to download the data. In addition, the user also may specify or select which of the one or more title symbols in initial data packet 320 to download. After receiving the input to download the selections, message handling application 310 instructs feedback control module 312 to send feedback packet 322 to server 304.

Feedback packet 322 may, for example, include an identification, address, checker, and size of each selected title symbol from initial data packet 320. Furthermore, feedback packet 322 also may include state and status information of client 302. Moreover, feedback packet 322 may include capacity and condition of the communication channel within network 305 between client 302 and server 304. Upon receiving feedback packet 322, server 304 transfers the information contained in feedback packet 322 to transmission control module 316.

Transmission control module 316 uses this data contained in feedback packet 322 to prioritize transmission of the one or more data downloads contained in feedback packet 322. Transmission control module 316 prioritizes transmission of the one or more data downloads by applying download priority rules. Download priority rules may, for example, include an address priority and/or a size priority. The address priority specifies which data download address has priority over other addresses. The size priority specifies which size data download has priority, for example, a larger size download may have priority over a smaller size download or vice versa.

In addition, transmission control module 316 uses the data contained in feedback packet 322 to control transmission of the one or more downloads within content request 318 by taking into account the state and status of client 302 and the capacity and condition of the communication channel between client 302 and server 304. Consequently, transmission control module 316 transmits requested content 324 to client 302 according to the download priority rules and the state, status, capacity, and condition data contained within feedback packet 322.

Further, feedback control module 312 may, for example, send feedback packet 322 to transmission control module 316 on a pre-determined time interval basis in order for transmission control module 316 to continually and dynamically change the transmission of requested content according to changing conditions in data processing system 300, such as the state and status of client 302 and the capacity and condition of the communication channel within network 305 between client 302 and server 304. The pre-determined time interval may, for example, be every one-half second. As a result, in this particular example feedback control module 312 sends feedback packet 322 to transmission control module 316 every one-half second to dynamically change the transmission of requested content 324 from server 304 to client 302.

Figure 4:
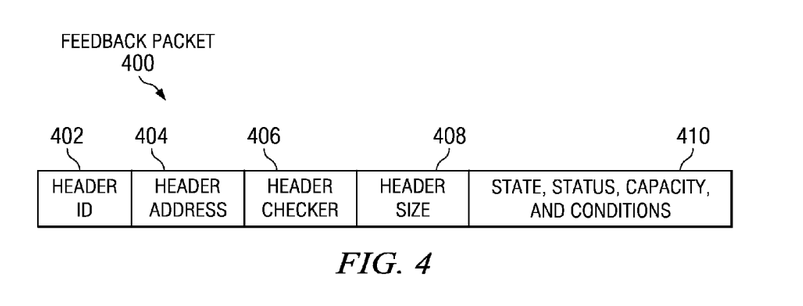
FIG. 4 is an exemplary illustration of a feedback packet in accordance with an illustrative embodiment.

With reference now to FIG. 4, an exemplary illustration of a feedback packet is depicted in accordance with an illustrative embodiment. Feedback packet 400 may, for example, be feedback packet 322 in FIG. 3. A feedback control unit sends feedback packet 400 to a transmission control unit to assist the transmission control unit in dynamically controlling the transmission of requested data from a server device to a client device via a network. For example, feedback control module 312 sends feedback packet 322 to transmission control module 316 to assist transmission control module 316 in dynamically controlling the transmission of requested content 324 from server 304 to client 302 via network 305.

Feedback packet 400 includes header identification (ID) 402, header address 404, header checker 406, header size 408, and state, status, capacity, and conditions 410. However, it should be noted that feedback packet 400 is only shown for illustration purposes and is not meant as a limitation on illustrative embodiments. Illustrative embodiments may include any information necessary within feedback packet 400 to accomplish processes of illustrative embodiments.

The transmission control unit uses header ID 402 to specifically identify each data download contained within the data request. The transmission control unit uses header address 404 to specifically locate each data download contained within the request for data. In addition, the transmission control unit may use header address 404 to prioritize each data download contained within the data request according to download address priority rules.

The transmission control unit uses header checker 406 to prevent transmission error. The header checker is basically an error correction code (ECC) with fixed length and format that is pre-defined. The transmission control unit utilizes header size 408 to determine the exact size of each data download contained within the data request. Further, the transmission control unit may use header size 408 to prioritize each data download contained within the data request according to download size priority rules.

The transmission control unit utilizes state, status, capacity, and conditions 410 to determine the state and status of the client device and the capacity and conditions of the communication channel within the network between the server device and the client device. The transmission control unit uses this information to dynamically adjust the transmission of the data request over the network.

Figure 5:
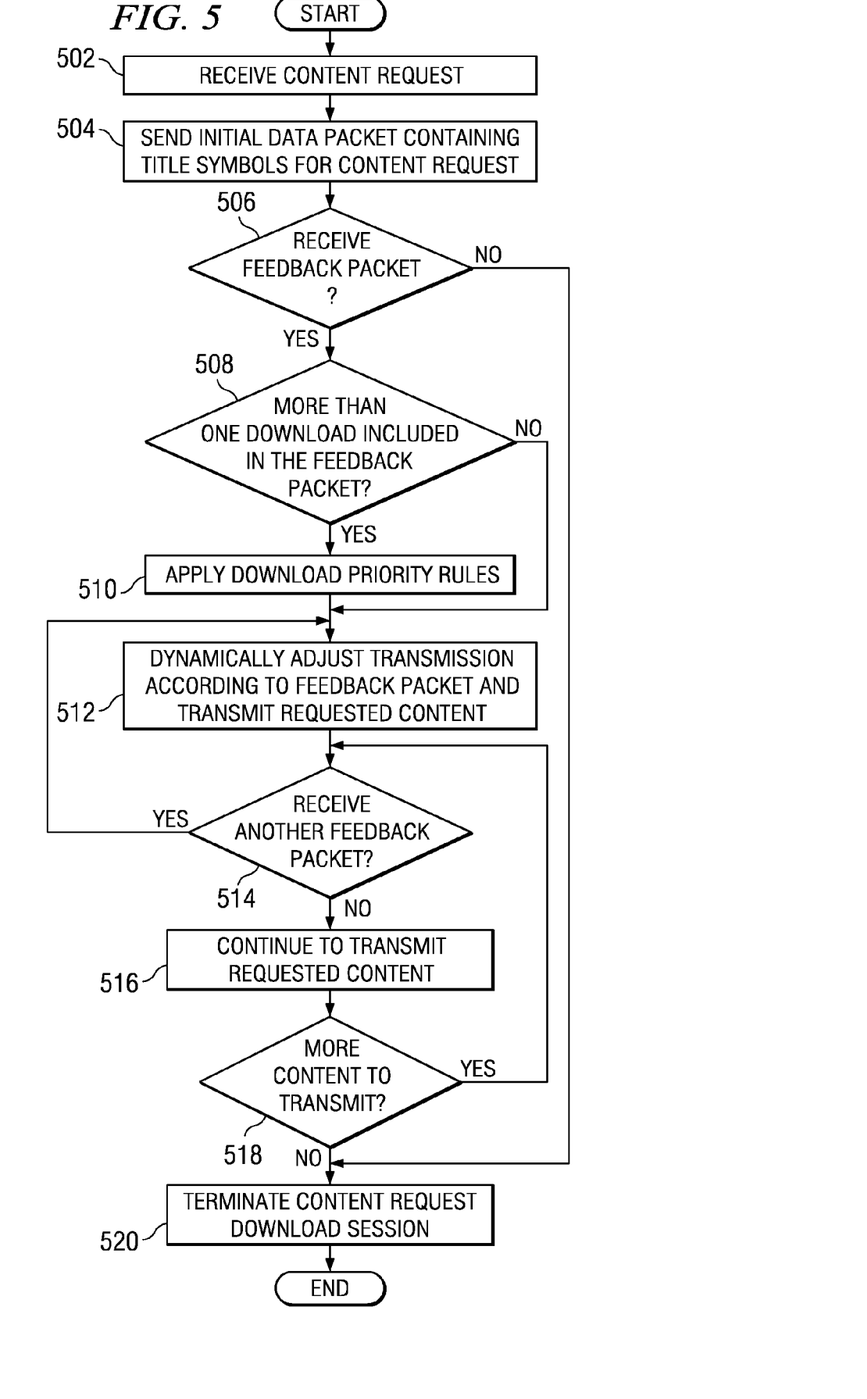
FIG. 5 is a flowchart illustrating an exemplary process for a server to control transmission of data over a network in accordance with an illustrative embodiment.

With reference now to FIG. 5, a flowchart illustrating an exemplary process for a server to control transmission of data over a network is shown in accordance with an illustrative embodiment. The process shown in FIG. 5 may be implemented in a server device, such as, for server 304 in FIG. 3.

The process begins when the server device receives a content request from a client device via a network (step 502). For example, server 304 receives content request 318 from client 302 via network 305 in FIG. 3. Subsequent to receiving the content request in step 502, the server device sends an initial data packet, such as, for example, initial data packet 320 in FIG. 3, which includes one or more title symbols for one or more downloads that are contained within the content request (step 504).

After sending the initial data packet in step 504, the server device makes a determination as to whether the server device receives a feedback packet, such as, for example, feedback packet 322 in FIG. 3, from the client device (step 506). If the server does not receive a feedback packet from the client device, no output of step 506, then the process proceeds to step 520 where the server device terminates the content request download session. If the server does receive a feedback packet from the client device, yes output of step 506, then the server device makes a determination as to whether more than one download is included in the feedback packet (step 508).

If the feedback packet does not include more than one download, no output of step 508, then the process proceeds to step 512 where the server device utilizes a transmission control module, such as, for example, transmission control module 316 in FIG. 3, to dynamically adjust data transmission according to the contents of the feedback packet and transmit the requested content, such as, for example, requested content 324 in FIG. 3. If the feedback packet does include more than one download, yes output of step 508, then the server device uses the transmission control module to apply download priority rules, such as, for example, priority by content address and/or content size, prior to transmitting the plurality of downloads from the content request (step 510). Subsequent to applying the download priority rules to the plurality of downloads in step 510, the transmission control module dynamically adjusts data transmission according to the contents of the feedback packet and transmits the requested content (step 512).

After dynamically adjusting data transmission according to the contents of the feedback packet and transmitting the requested content in step 512, the server device makes a determination as to whether the server device receives another feedback packet from the client device (step 514). If the server device does receive another feedback packet from the client device, yes output of step 514, then the process returns to step 512 where the transmission control module once again dynamically adjusts data transmission according to the contents of the feedback packet and continues to transmit the requested content. If the server device does not receive another feedback packet from the client device, no output of step 514, then the server device continues to transmit the requested content as before (step 516).

Subsequent to the server device continuing to transmit the requested content in step 516, the server device makes a determination as to whether more requested content remains to be transmitted (step 518). If more requested content does remain to be transmitted, yes output of step 518, then the process returns to step 514 where the server device makes a determination as to whether the server device receives another feedback packet from the client device. If more requested content does not remain to be transmitted, no output of step 518, then the server device terminates the content request download session (step 520). The process terminates thereafter.

Figure 6:
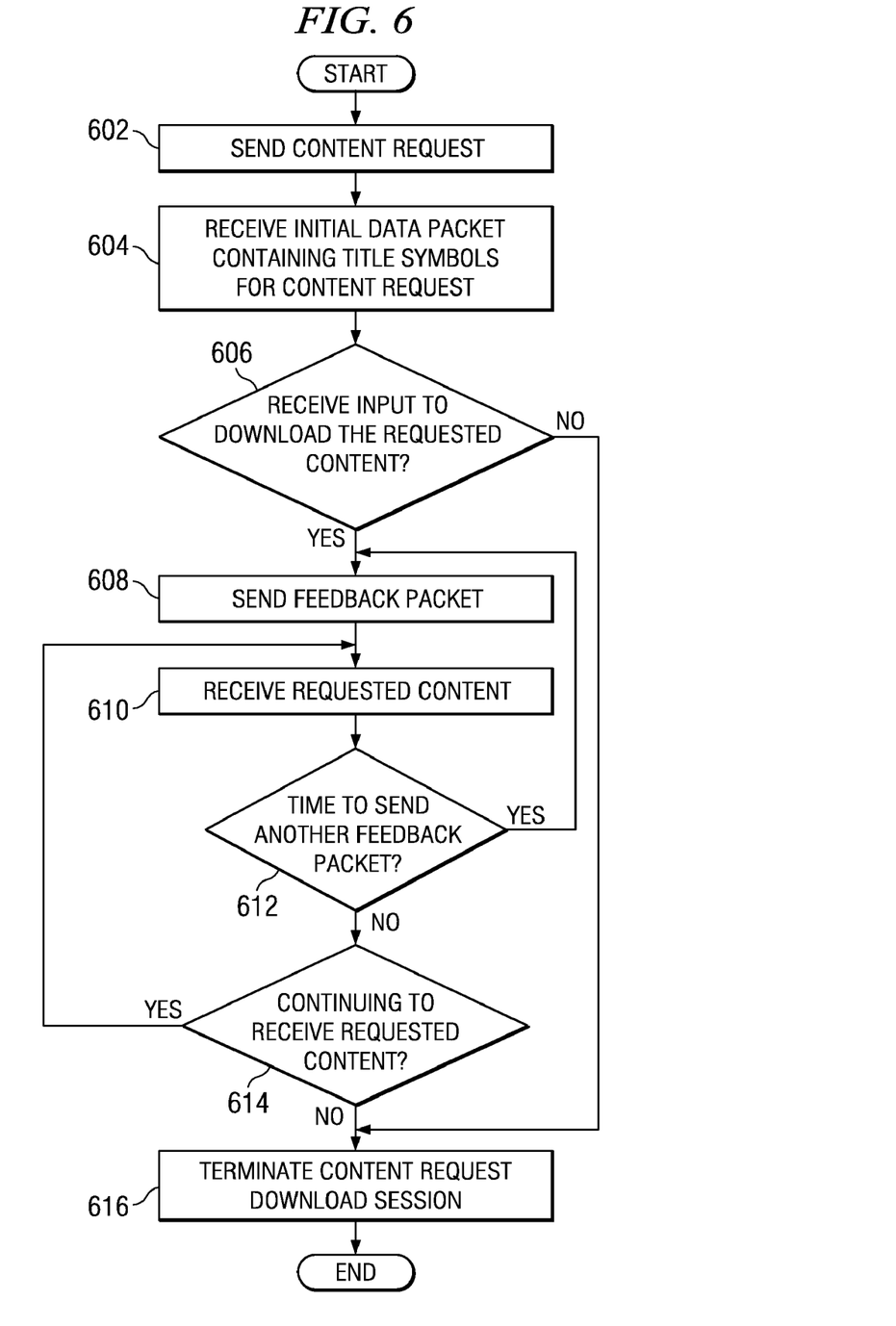
FIG. 6 is a flowchart illustrating an exemplary process for a client to send feedback to a server to control transmission of data over a network in accordance with an illustrative embodiment.

With reference now to FIG. 6, a flowchart illustrating an exemplary process for a client to send feedback to a server to control transmission of data over a network is shown in accordance with an illustrative embodiment. The process shown in FIG. 6 may be implemented in a client device, such as, for client 302 in FIG. 3.

The process begins when the client device sends a content request to a server device via a network (step 602). For example, client 302 sends content request 318 to server 304 via network 305 in FIG. 3. Subsequent to sending the content request in step 602, the client device receives an initial data packet, such as, for example, initial data packet 320 in FIG. 3, which includes one or more title symbols for one or more downloads that are contained within the content request (step 604).

After receiving the initial data packet in step 604, the client device makes a determination as to whether the client device receives a user input to download the requested content (step 606). Alternatively, the client device may automatically receive an input from a message handling application, such as, for example, message handling application 310 in FIG. 3, to download the requested content after receiving the initial data packet in step 604. If the client device does not receive an input to download the requested content, no output of step 606, then the process proceeds to step 616 where the client device terminates the content request download session. If the client device does receive an input to download the requested content, yes output of step 606, then the client device uses a feedback control module, such as feedback control module 312 in FIG. 3, to send a feedback packet, such as, for example, feedback packet 322 in FIG. 3, to the server device to assist a transmission control module, such as, for example, transmission control module 316 in FIG. 3, to dynamically control transmission of the download of the content request (step 608).

Subsequent to the feedback control module sending the feedback packet in step 608, the client device starts to receive the requested content from the server device (step 610). After the client device initially receives the requested content from the server device in step 610, the feedback control module makes a determination as to whether it is time to send another feedback packet to the server device (step 612). The feedback control module sends the feedback packets to the server device on, for example, a pre-determined time interval basis, such as every second, five seconds, ten seconds, 15 seconds, 30 seconds, or 60 seconds. However, it should be noted that illustrative embodiments may utilize any time interval to send feedback packets to the server device to accomplish processes of illustrative embodiments.

If it is time to send another feedback packet to the server device, yes output of step 612, then the process returns to step 608 where the feedback control module sends a feedback packet. If it is not time to send another feedback packet to the server device, no output of step 612, then the client device makes a determination as to whether the client device is continuing to receive the requested content from the server device (step 614). If the client device is continuing to receive the requested content, yes output of step 614, then the process returns to step 610 where the client device continues to receive the requested content. If the client device is not continuing to receive the requested content, no output of step 614, then the client device terminates the content request download session (step 616). The process terminates thereafter.

Thus, illustrative embodiments provide a computer implemented method, system, and computer usable program code for controlling transmission of data over asymmetrical communication network channels. The invention may take the form of an entirely hardware embodiment, an entirely software embodiment, or an embodiment containing both hardware and software elements. In a preferred embodiment, the invention is implemented in software, which includes but is not limited to firmware, resident software, microcode, et cetera.

Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a ROM, a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters also may be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method operable by a computer for controlling transmission of data over a network, the method comprising:
responsive to receiving, by the computer, a content request from a client device coupled to the network, sending an initial data packet to the client device by the computer; and
responsive to receiving, by the computer, a feedback packet from the client device, dynamically adjusting transmission of the content request by the computer, wherein the dynamically adjusting transmission of the content request step is performed according to data contained within the feedback packet, wherein the data contained within the feedback packet includes a state and status of the client device and a capacity and condition of a communication channel within the network between the client device and a server device.

2. The method of claim 1, wherein the data contained within the feedback packet also includes a header identification, header address, header checker, and header size, wherein the header identification is used to specifically identify each data download, the header address is used to specifically locate the each data download, and the header size is used to determine a size for the each data download.

3. The method of claim 2, further comprising:
responsive to determining that the content request includes a plurality of downloads, applying download priority rules to the plurality of downloads, wherein the download priority rules include a priority for a content address and a content size, and wherein the content address and the content size are determined by the header address and header size contained within the feedback packet.

4. The method of claim 1, wherein the communication channel within the network is an asymmetric communication channel.

5. A method operable by a computer for controlling transmission of data over a network, the method comprising:
responsive to receiving, by the computer, a content request from a client device coupled to the network, sending an initial data packet to the client device by the computer; and
responsive to receiving, by the computer, a feedback packet from the client device, dynamically adjusting transmission of the content request by the computer, wherein the dynamically adjusting transmission of the content request step is performed according to data contained within the feedback packet, wherein the initial data packet includes title symbols for a plurality of data downloads contained within the content request, wherein each title symbol of the title symbols includes a title and size of its respective data download.

6. A data processing system for controlling transmission of data over a network, comprising:
a bus system;
a storage device connected to the bus system, wherein the storage device includes a set of instructions; and
a processing unit connected to the bus system, wherein the processing unit executes the set of instructions to send an initial data packet to a client device coupled to the network in response to receiving a content request from the client device and dynamically adjust transmission of the content request in response to receiving a feedback packet from the client device, wherein the set of instructions to dynamically adjust transmission of the content request use data contained within the feedback packet, wherein the processing unit executes a further set of instructions to apply download priority rules to a plurality of downloads in response to determining that the content request includes the plurality of downloads.

7. The data processing system of claim 6, wherein the data contained within the feedback packet includes a state and status of the client device and a capacity and condition of a communication channel within the network between the client device and a server device.

8. The data processing system of claim 7, wherein the communication channel within the network is an asymmetric communication channel.

9. A computer program embodied on a non-transitory computer readable medium to form a computer program product for controlling transmission of data over a network, the computer program product comprising:
computer usable program code configured to send an initial data packet to a client device coupled to the network in response to receiving a content request from the client device; and
computer usable program code configured to dynamically adjust transmission of the content request in response to receiving a feedback packet from the client device, wherein the computer usable program code configured to dynamically adjust transmission of the content request uses data contained within the feedback packet, further comprising:
computer usable program code configured to apply download priority rules to a plurality of downloads in response to determining that the content request includes the plurality of downloads.

10. The computer program product of claim 9, wherein the data contained within the feedback packet includes a state and status of the client device and a capacity and condition of a communication channel within the network between the client device and a server device.

11. The computer program product of claim 10, wherein the data contained within the feedback packet also includes a header identification, header address, header checker, and header size, wherein the header identification is used to specifically identify each data download, the header address is used to specifically locate the each data download, and the header size is used to determine a size for the each data download.

12. The computer program product of claim 11, wherein the download priority rules include a priority for a content address and a content size, and wherein the content address and the content size are determined by the header address and header size contained within the feedback packet.

13. A method operable by a computer for controlling transmission of data over a network, the method comprising:
responsive to sending, by the computer, a content request to a server device coupled to the network, receiving an initial data packet from the server device by the computer; and
responsive to receiving, by the computer, an input to continue with a download of the content request, sending a feedback packet by the computer to the server device to assist the server device in dynamically controlling transmission of the download of the content request, wherein the feedback packet is sent to the server device on a pre-determined time interval thereafter.

* * * * *